United States Patent Office 2,986,567
Patented May 30, 1961

2,986,567
NEW HYDROPHENANTHRENE COMPOUNDS
Tadeus Reichstein, Albert Wettstein, Georg Anner, Jean-Rene Billeter, and Karl Heusler, Basel, Robert Neher, Binningen, Julius Schmidlin, Basel, Hellmut Ueberwasser, Riehen, and Peter Wieland, Basel, Switzerland; said Wettstein, said Anner, said Billeter, said Heusler, said Neher, said Schmidlin, said Ueberwasser, and said Wieland, assignors to said Reichstein
No Drawing. Filed May 16, 1956, Ser. No. 585,143
Claims priority, application Switzerland Jan. 15, 1954
15 Claims. (Cl. 260—340.9)

This is a continuation-in-part application to application Serial No. 480,062, filed January 5, 1955 (now abandoned).

The highly active hormone of the suprarenal gland which is responsible of the regulation of the mineral metabolism in the human body is known to be a pregnene compound of the following formulae which obviously represent an equilibrium

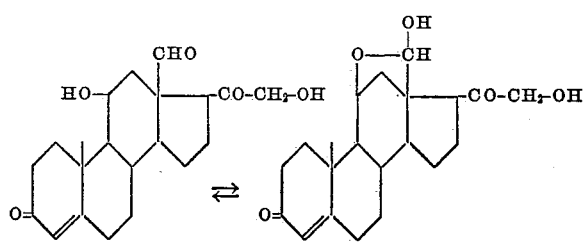

Since this important hormone has so far been available only by a tedious extractive procedure from suprarenal glands of animals and could only be obtained in very low yield (40 to 95 mg. from 1000 kilos of fresh beef adrenals), a synthesis of this hormone and closely related 18-oxygenated hormones (e.g. the 18-hydroxy compound corresponding to aldosterone, viz $\Delta^4$-3:20-dioxo-11$\beta$:18:21-trihydroxy-pregnene, that is 18-hydroxy-corticosterone which shows a similar high physiological activity) from readily available compounds either from other naturally occurring steroids or a total synthesis is of extraordinary technical importance.

The present invention thus provides a series of intermediates which can readily be converted into aldosterone or into the 18-hydroxy-corticosterone, thus making these hormones available in sufficient quantity.

The invention more specifically relates to compounds of the formula (A)

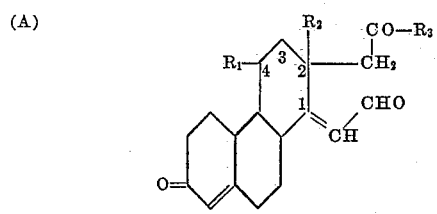

and derivatives thereof, such as esters, ethers and ketals, in which formula $R_1$ is a hydroxy or oxo-group, $R_2$ a hydroxy-methyl group, an aldehyde group or a carboxyl group and $R_3$ is a hydrogen atom, a methyl group or a hydroxymethyl group.

The above mentioned compounds are convertible by the method of copending application Serial No. 585,144, filed May 16, 1956 (now abandoned) into compounds of the formula (B)

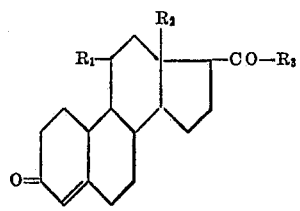

in which $R_1$, $R_2$ and $R_3$ have the same meaning as in Formula A, which method consists in treating the compounds of the above Formula A with catalytically activated hydrogen (e.g. hydrogenation in alcoholic solution with a palladium on charcoal catalyst) and cyclizing the compound thereby obtained by intramolecular condensation of the aldehyde group with the methylene group at carbon atom 2, especially by treatment with triethylamine benzoate in boiling xylene for several hours and saturating the 16:17-double bond in the pregnene compounds, for example by hydrogenation in ethanol in the presence of a palladium on calcium carbonate catalyst.

The compounds of the Formula B are convertible by the methods indicated below into $\Delta^4$-3:20-dioxo-21-dihydroxy-pregnene of the formula (C)

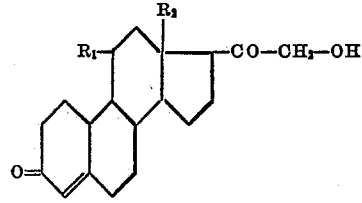

or derivatives thereof, such as esters, ketals and ethers, in which formula $R_1$ and $R_2$ have the same meaning as in Formula A.

If $R_1$ represents a hydroxyl group and $R_2$ an aldehyde group or a hydroxymethyl group the compound of the above Formula C then obtained is identical with the physiologically highly active natural hormone aldosterone or with 18-hydroxy-corticosterone, respectively. If however, in the compound obtained $R_1$ and/or $R_2$ differ from the above indicated groups they are converted into a hydroxy and an aldehyde group or hydroxymethyl group, respectively, as follows:

If $R_1$ is an oxo group, the compound of the above formula is treated in an inert solvent, such as benzene or a halogenated hydrocarbon, such as dichloroethylene, with a ketalizing agent, such as ethylene glycol, trimethylene-glycol, mercaptoethanol, dithioglycol, in the presence of an acidic catalyst, whereby all the oxo groups present in the molecule are converted in the conventional manner into ketals except for the 11-oxo group, which can then be reduced by treatment with a complex metal hydride, such as sodium or lithium borohydride or lithium aluminum hydride.

The conversion of $R_2$ into an aldehyde group or hydroxymethyl group in the compounds of the above Formula C wherein $R_1$ represents an oxy group is performed in the following way: The conversion of an (18—11$\beta$)-lactone of an 11$\beta$-hydroxy-18-acid into the hydroxy aldehyde or the hydroxy-hydroxymethyl compound is described in detail in application Serial No. 585,168, filed May 16, 1956 (now abandoned) and is effected by reduction with a limited amount of a complex metal hydride, such as lithium aluminum hydride, after protection of the free oxo groups in the 3- and 20-positions by ketalization as described above.

The conversion of a substituent R₃ different from a hydroxymethyl group in the above Formula B into a hydroxymethyl group may be effected in the following way: If R₃ is a hydrogen atom, the 17-aldehyde group is oxidized according to known methods, for instance with the aid of chronic acid or more easily with potassium permanganate in alkaline solution to a carboxyl group and this group is then transformed into the oxyacetyl group according to the method of application Serial No. 480,061 filed January 5, 1955, now Patent No. 2,904,545 issued September 15, 1959, for instance by converting the 17-carboxylic acid into an acid halide, such as the acid chloride by the reaction with oxalyl chloride in benzene solution, reacting the acid chloride with diazomethane and decomposing the diazoketone thus obtained with glacial acetic acid at about 100° C., whereby the 21-acetoxy compound is formed which may be hydrolyzed with sodium bicarbonate in an aqueous methanolic solution.

If R₃ is a methyl group it can be converted into an oxyacetyl group by the method described in application Serial No. 585,142, filed May 16, 1956 (now abandoned), which method consists in reacting the 21-desoxy compounds, preferably after protection of the keto group in 3-position by ketalization and of the functional group in 13-position by esterification or etherification, with an oxalic acid ester e.g. with dimethyloxalate in the presence of about 1.5 molar equivalents of sodium methoxide in benzene solution at room temperature, treating the condensation product obtained in the form of its enol salt e.g. its sodium salt in methanol with a halogen, such as iodine, subjecting to acid cleavage the 21-halogen-21-oxalo-acid esters formed by reaction with about one molar equivalent of sodium methoxide in methanol and convertnig the 21-halides into 21-esters by reaction with a carboxylic acid salt, such as potassium acetate in acetone; finally ester-, ether- and ketal-groupings are hydrolized in known manner.

The derivatives of the compounds of the formula given above may be esters, thioesters, enolesters, ethers, enol-ethers, thioethers, acetals, ketals, mercaptals, lactones, cyclosemicacetals, thiol- and thionesters, enamines, hydrazones, semicarbazones and the like. An aldehyde or carboxyl group in 13-position can be acetalized or lactonized with a hydroxyl group in the 11-position. The compounds can be racemic or optically active.

The compounds of the present application are prepared in the following ways:

(a) A compound of the formula (D)

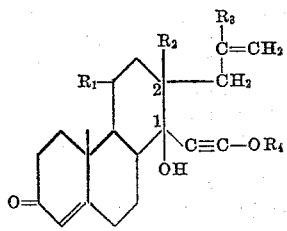

or a functional derivative thereof, such as an ester, ketal and/or ether in which formula R₁ represents a hydroxy or oxo group, R₂ a hydroxymethyl, an aldehyde or a carboxyl group, R₃ a methyl group or a hydrogen atom and R₄ a lower alkyl or monocyclic aryl group is treated with ozone to give the ozonide of the allyl or methallyl residue at carbon atom 2 which is then reductively split to give an aldehyde or methyl ketone respectively. Then the ethinyl residue is reduced to a ethenyl residue by catalytic hydrogenation and finally the 1-hydroxy-1-ethenyl compound is rearranged to a 1-formyl-methylene compound.

(b) A compound of the above Formula D is hydroxylated at the allyl or methallyl group, then reduced to the ethenyl group, the glycol grouping is then split to form an aldehyde or methylketone respectively, and the compound obtained is then rearranged to the 1-formyl-methylene compound as indicated above.

(c) In a glycol obtained from a 2-allyl compound as indicated under b above the ethinyl residue is reduced to an ethenyl group the compound obtained is selectively esterified at the primary hydroxyl group, then the secondary hydroxyl group is oxidized to an oxo group and the product rearranged to a 1-formyl-methylene compound.

The addition of ozone to the double bond of the allyl or methallyl residue in 2-position is carried out in an inert solvent such as ethylacetate or advantageously also in a chlorinated hydrocarbon as solvent, for example, in chloroform. It is preferable to cool the reaction mixture during ozonisation e.g. to a temperature between +10° C. and −30° C. The splitting of the ozonide obtained is advantageously brought about reductively, for example, with zinc in aqueous acetic acid containing pyridine.

The hydroxylation of the double bond of the methallyl residue in the 2-position can be carried out by means of various oxidizing agents. Especially suitable oxidizing agents are, for example osmium tetroxide, hydrogen peroxide in the presence of catalytic amounts of osmium tetroxide, or tungsten trioxide, potassium permanganate, or silver benzoate and iodine. The splitting of the osmium acid ester may also be carried out without simultaneous hydrolysis of a 3:3-ethylenedioxy-grouping which may be present, by carrying out this reaction, for example, by means of ammonium sulphite.

The substituted ethinyl residue in the 1-position can be converted into an ethenyl residue especially easily by means of catalytically activated hydrogen. As catalyst there may be used, more especially, palladium or lead catalysts, advantageously on a carrier substance, and in the presence of a solvent, such as pyridine, suitable for selective reduction.

For the glycol splitting of compounds formed by the hydroxylation of the starting materials followed by the conversion of the 1-ethinyl residue into an ethenyl residue there is preferably used periodic acid in a buffered solution to prevent the hydrolysis of any ketal or enol ether groupings present in the molecule or lead tetracetate, or an acyliodoso acylate.

In the glycols obtained by the hydroxylation of the 2-allyl group it is possible to esterify the primary hydroxyl group selectively, e.g. by treatment with slightly more than one molar equivalent of an acid anhydride such as acetic anhydride in pyridine solution. In the monoacylate obtained, the secondary hydroxyl group is then oxidized to an oxo group with a mild oxidizing agent such as the pyridine-chromium trioxide-complex. The reduction of the ethinyl residue to the ethenyl residue may be performed at any intermediate stage during the above transformations.

The rearrangement of the 1-oxy-1-ethenyl-compound to form the 1-formyl-methylene-compound is carried out by the action of an agent having a hydrolysing or isomerizing action. When this rearrangement must be carried out without any 3:3-ethylenedioxy-grouping being simultaneously attacked, there are advantageously used for this reaction halides of phosphorous or sulfurous acid, for example phosphorus tribromide or thionyl chloride, in the presence of a suitable solvent, such as methylene chloride, chloroform, and an organic base, for example, pyridine.

The new compounds obtained according to the process described above are hydrophenanthrenes of the formula

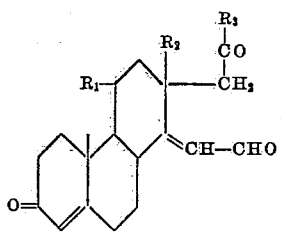

and their 3-ketals, in which $R_1$ stands for a free or esterified hydroxyl group, an oxy group linked with the 18-carbon atom or an oxo group, $R_2$ stands for a free or esterified hydroxymethyl group or a free or acetalized aldehyde group or a free or esterified (especially lactonized) carboxyl group, $R_3$ stands for a hydrogen atom, a methyl group or a free or esterified hydroxymethyl group. There are also obtained various new intermediates for the preparation of the above mentioned compounds, namely hydrophenanthrenes of the following types

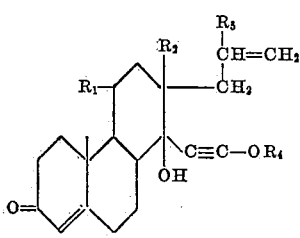

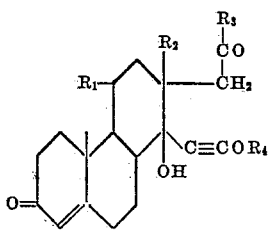

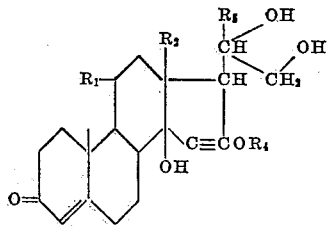

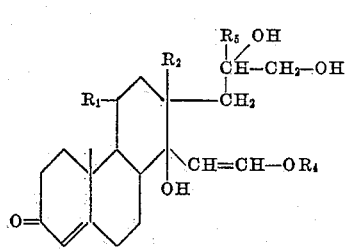

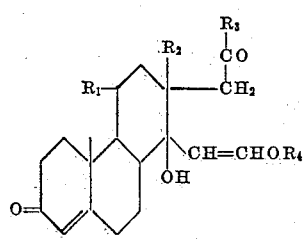

and esters and 3-ketals of these compounds, wherein $R_1$, $R_2$ and $R_3$ have the same meaning as indicated above and $R_4$ stands for a lower alkyl radical and a monocyclic aryl radical and $R_5$ for a hydrogen atom or a methyl group. The starting materials for the preparation of the new compounds of this application are prepared from known hydrophenanthrene derivatives such as (F)

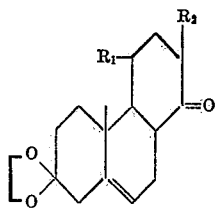

in which formula $R_1$ stands for a hydroxyl or oxo group and $R_2$ for a hydrogen atom. These compounds are condensed in the presence of an alkali metal alkoxide such as sodium methoxide or ethoxide or in the presence of sodamide or sodium hydride with a dialkyl carbonate, especially with diethyl carbonate. In the case where $R_1$ is a keto group a normal 1-carbethoxy-derivative is obtained which is alkylated in an anhydrous medium, such as in acetone or tertiary butanol solution in the presence of an alkaline agent e.g. potassium carbonate or an alkoxide such as potassium tertiary butoxide with an allyl or methallyl halide, preferably an iodide (which might also be prepared in the reaction mixture from another halide such as the chloride and potassium iodide). By these reactions a mixture of stereoisomeric forms of a compound of the formula (G)

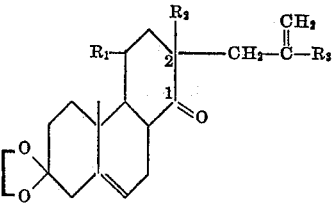

is formed where $R_1$ stands for an oxo group $R_2$ for a carbalkoxy group and $R_3$ for a hydrogen atom or a methyl group.

The condensation with a dialkylcarbonate as mentioned above with a compound of the Formula F in which $R_1$ stands for a hydroxyl group is described in detail in our copending application Serial No. 585,167, filed May 16, 1956, now Patent No. 2,934,543, issued April 26, 1960. It is shown that this condensation gives compounds of the Formula F in which $R_1$ stands for an alkoxycarbonyloxy residue and $R_2$ for a carbalkoxy group. These compounds are alkylated as indicated above to give the corresponding derivatives of the type G. Either of the compounds of the Formula G in which $R_1$ stands for an oxo and an alkoxycarbonyloxy group can be used for the condensation with the alkoxyacetylene as described below. However, it has been found—as is more particularly described in the above mentioned copending application—that it is of particular advantage to modify the substituents $R_1$ and $R_2$ in such a way to obtain a lactone grouping. This is achieved by reducing the compound of the Formula G wherein $R_1$ is an alkoxycarbonyloxy and $R_2$ a carbalkoxy group with sodium borohydride in alcoholic solution in order to reduce the oxo group in the 1-position, then by hydrolizing the ester group present by means of aqueous alcoholic caustic soda solution followed by acidification, whereby a compound of the Formula H (H) 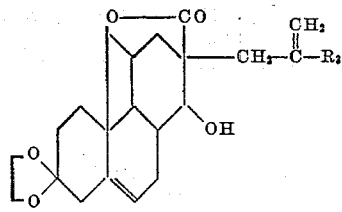

is formed. By oxidation, especially with the aid of the chromium trioxide pyridine complex the 1-oxo group is regenerated to give a compound of the type (G) in which $R_1$ is an oxy group lactonized with the carboxyl group $R_2$ at carbon atom 2.

The compounds of the type (G) are then treated in an open chain or cyclic ether solvent with an alkoxy- or aryloxy acetylene magnesium halide (e.g. with ethoxyacetylene magnesium bromide) to give after hydrolysis the starting compounds for the preparations described in the present application.

The following examples illustrate the invention, the parts being by weight unless otherwise stated, and the relationship of parts by weight to parts by volume being the same as that of the gram to the cubic centimeter:

*Example 1*

To an aqueous solution of 4.43 parts of the $(2\rightarrow 4\beta)$-lactone of $\Delta^{8a}$-1-ethoxyethinyl-2α-methallyl-2β-carboxy-4bβ - methyl - 7 - ethylenedioxy - 1:2:3:4:4aα:4b:5:6:7:8:10:10aβ - dodecahydrophenanthrene - 1:4β - diol in 300 parts by volume of ether and 2.1 parts by volume of pyridine are added 2.80 parts of osmium tetroxide, which is rinsed in with 25 parts by volume of ether, and the whole is stirred for 2 hours at room temperature. The precipitated osmium acid ester is then dissolved by the addition of 1000 parts by volume of methanol, and mixed, while stirring, with 1000 parts by volume of an 0.25-molar aqueous solution of ammonium sulphite. After a further hour, the precipitated inorganic material is filtered off with suction through a layer of Super-Cel, and the filtrate is evaporated in vacuo at room temperature to about one-fifth of its original volume. The semi-solid precipitated hydroxylation product is taken up in a mixture of methylene chloride and ether (3:1), the solution is washed with water, then dried with sodium sulfate and evaporated in vacuo. From a small quantity of ether there is obtained the $(2\rightarrow 4\beta)$-lactone of the $\Delta^{8a}$-1-ethoxyethinyl-2α-(2':3'-dioxy-isobutyl)-2β-carboxy - 4bβ - methyl - 7 - ethylenedioxy - 1:2:3:4:4aα:4b:5:6:7:8:10:10aβ - dodecahydrophenanthrene - 1:4β-diol as an epimeric mixture melting at 127–153.5° C. (with decomposition).

A solution of 3.678 parts of the $(2\rightarrow 4\beta)$-lactone of $\Delta^{8a}$ - 1 - ethoxyethinyl - 2α - (2':3' - dioxy - isobutyl) - 2β - carboxy - 4bβ - methyl - 7 - ethylenedioxy - 1:2:3:4:4aα:4b:5:6:7:8:10:10aβ - dodecahydrophenanthrene-1:4β-diol in 77.5 parts by volume of anhydrous pyridine is agitated in the presence of 1.54 parts of a 10 percent palladium-calcium carbonate catalyst with hydrogen. The hydrogenation ceases after 1 molecular equivalent of gas has been absorbed. The whole is then filtered through a layer of Super-Cel to remove the catalyst, and the filtrate is evaporated in vacuo. By crystallization from ether there is obtained the $(2\rightarrow 4\beta)$-lactone of $\Delta^{8a}$ - 1 - ethoxyethenyl- 2α - (2':3' - dioxy - isobutyl)- 2β - carboxy - 4bβ - methyl - 7 - ethylene dioxy - 1:2:3:4:4aα:4b:5:6:7:8:10:10aβ - dodecahydrophenanthrene-1:4β-diol in the form of an epimeric mixture of fine prisms melting at 148–151° C.

For the purpose of glycol splitting 3.071 parts of the $(2\rightarrow 4\beta)$-lactone of $\Delta^{8a}$-1-ethoxyethenyl-2α-(2':3'-dihydroxy - isobutyl) - 2β - carboxy - 4bβ - methyl - 7 - ethylenedioxy - 1:2:3:4:4aα:4b:5:6:7:8:10:10aβ - dodecahydrophenanthrene-1:4β-diol are dissolved in 45.0 parts by volume of methanol and 8.8 parts by volume of pyridine, and, after admixture with 9.65 parts by volume of a 1-molar aqueous solution of periodic acid, the whole is allowed to stand for one hour at room temperature. There are then added 26.5 parts by volume of water and 96.5 parts by volume of an 0.1-molar aqueous solution of sodium hydrogen carbonate, and the mixture is strongly concentrated in vacuo at 20–25° C. The residue is extracted with a mixture of ether and methylene chloride (3:1), the extract is washed with ice-cold 0.5-molar orthophosphoric acid, ice-cold 0.1-molar sodium hydrogen carbonate solution and ice water, and the extract solution is dried with sodium sulfate and evaporated to give an almost colorless crystalline residue. From the residue there is obtained by recrystallization from ether with the use of methylene chloride as solution-promoter, the $(2\rightarrow 4\beta)$-lactone of $\Delta^{8a}$-1-ethoxyethenyl-2α-acetonyl - 2β - carboxy - 4bβ - methyl - 7 - ethylenedioxy-1:2:3:4:4:aα:4b:5:6:7:8:10:10aβ - dodecahydropenanthrene-1:4β-diol in the form of fine colorless prisms melting at 122–124° C.

A solution of 8.930 parts of $(2\rightarrow 4\beta)$-lactone of $\Delta^{8a}$-1-ethoxyethenyl - 2α - acetonyl - 2β - carboxy - 4bβ - methyl - 7 - ethylenedioxy - 1:2:3:4:4aα:4b:5:6:7:8:10:10aβ-dodecahydrophenanthrene-1:4β-diol in 96.0 parts by volume of chloroform and 4.05 parts by volume of pyridine is mixed at 0° C. in the course of 15 minutes with 100 parts by volume of a 0.5-molar phosphorus tribromide and 2-molar pyridine solution in chloform, and the whole is stirred in at atmosphere of nitrogen for 4 hours at 0° C. The mixture is then poured on to 750 parts by volume of a 1-molar solution of sodium hydrogen carbonate and ice and extracted with chloroform and ether. The chloroform extracts and the chloroform-ether extracts are washed with 0.6 N-ortho-phosphoric acid, a 1-molar solution of sodium hydrogen carbonate and water, and then combined and, after being dried with sodium sulfate, the whole is evaporated under reduced pressure. The residue is recrystallized from a mixture of acetone and ether (about 1:3) with the use of methylene chloride as solution-promoter. The pure $(2\rightarrow 4\beta)$-lactone of $\Delta^{8a}$-1:1-formylmethylene-2α-acetonyl-2β - carboxy - 4bβ - methyl - 7 - ethylenedioxy - 1:2:3:4:4aα:4b:5:6:7:8:10:10aβ - dodecahydrophenanthrene-4β-ol is obtained in the form of almost colorless prisms melting at 183.5–187° C. The compound reduces an alkaline silver diamine solution instantaneously.

*Example 2*

84 parts by weight of $(2\rightarrow 4\beta)$-lactone of $\Delta^{8a}$-1-ethoxyethinyl - 2α - methallyl - 2β - carboxy - 4bβ - methyl - 7-ethylenedioxy - 1:2:3:4:4aα:4b:5:6:7:8:10:10aβ - dodecahydrophenanthrene-1:4β-diol are dissolved in 80 parts by volume of pyridine and 520 parts by volume of chloroform. While the reaction solution is being stirred vigorously at —15 to —18° C. for 142 minutes, ozoniferous air or azoniferous oxygen is introduced, 0.056 part by weight of ozone combining per minute. The dissolved oxygen is then expelled by introducing nitrogen and there is added to the reaction solution a mixture, cooled to —15° C. of 100 parts by volume of water, 100 parts by volume of glacial acetic acid, and 200 parts by volume of pyridine. This addition is followed immediately by an addition if five portions of an aqueous zinc magma prepared from 100 parts by weight of zinc dust by activating it with dilute acetic acid. The reduction of the ozonide at —18 to —3° C. is complete at the end of 15 minutes. Excess zinc is removed by quick filtering with suction and rinsing with benzene. The organic layer of the filtrate is freed from zinc salts and acid constituents by repeated washing with water and then with sodium bicarbonate solution. The aqueous layers are extracted by shaking with benzene. The combined organic solutions are thoroughly dried with sodium sulfate and concentrated under reduced pressure, and the residue freed from pyridine in a high vacuum. The crude product is dissolved in 1200 parts by volume of benzene and filtered through a 6 cm. layer of alumina (activity 2). On concentration of the filtrate 60 parts by weight of the 2—4β)-lactone of $\Delta^{8a}$ - 1 - ethoxyethinyl - 2α - acetonyl - 2β - carboxy-4bβ - methyl - 7 - ethylenedioxy - 1:2:3:4:4aα:4b:5:6: 7:8:10:10aβ - dodecahydrophenanthrene - 1:4β - diol crystallize in the form of colorless crystals which melt and decompose at 157–158° C. As another crystal fraction there is obtained the product which is isomeric in 1-position and melts and decomposes at 179° C. By chromatography on alumina another 11 to 13 parts by weight of the isomer obtained as the main product of melting point 157–158° C. is obtained.

100 parts by weight of the afore-described ethoxyethinyl compound of melting point 157–158° C. are dissolved in 750 parts by volume of pyridine and, after the addition of 20 parts by weight of a palladium-calcium carbonate catalyst of a palladium content of 10 percent, agitated in a hydrogen atmosphere, the temperature being maintained at 22–16° C. by cooling. When 5150 parts by volume of hydrogen have combined the hydrogenation rate falls to less than 2 percent of the initial rate. The catalyst is removed and the pyridine expelled by distillation under reduced pressure. On the addition of ether, the (2→4β)-lactone of $\Delta^{8a}$-1-ethoxyethenyl-2α-acetonyl-2β - carboxy - 4bβ - methyl - 7 - ethylenedioxy - 1:2:3: 4:4aα:4b:5:6:7:8:10:10aβ - dodecahydrophenanthrene-1:4β - diol described in Example 1 crystallizes. At this stage, the crystals still contain ether. By boiling with n-hexane there are obtained 96 parts by weight of the compound which melts at 124° C. without decomposition and contains no crystal solvent.

This lactone can be converted into the (2→4β)-lactone of $\Delta^{8a}$ - 1 - formylmethylene - 2α - acetonyl - 2β - carboxy - 4bβ - methyl - 7 - ethylenedioxy - 1:2:3:4:4aα: 4b:5:6:7:8:10:10aβ - dodecahydrophenanthrene - 4β - ol as described in Example 1.

*Example 3*

0.899 part by weight of the (2→4β)-lactone of $\Delta^{8a}$-1-ethoxyethinyl - 2α - allyl - 2β - carboxy - 4bβ - methyl-7 - ethylenedioxy - 1:2:3:4:4aα:4b:5:6:7:8:10:10aβ-dodecahydrophenanthrene-1:4β-diol with melting point 146–148° C. is dissolved in 2.7 parts by volume of pyridine, diluted with 85 parts by volume of absolute ether and mixed with 0.585 part by weight of osmium tetroxide in 18 parts by volume of absolute ether at 20° C. After allowing the mixture to stand for 130 minutes at 20° C. it is diluted with 90 parts by volume of ether, and then in the course of 10 minutes 270 parts by volume of methanol and then 270 parts by volume of 0.25 N-ammonium sulfite solution in water are run in slowly. After 60 minutes at 20° C. the mixture is suction-filtered through a layer or kieselguhr (Hyflo Super-Cel) on a filter, and the clear filtrate is concentrated under reduced pressure at 30° C. bath temperature to 250 parts by volume. The aqueous solution is extracted with a mixture of chloroform and ether; the chloroform-ether solutions are washed twice with a little water, dried over sodium sulfate and evaporated under reduced pressure. The residue, 0.935 part by weight, is chromatographed over 28 parts by weight of silicagel. 0.061 part by weight of starting material is recovered from the fractions obtained with the mixture of benzene and ether (80:20). From the fractions eluated with ether-acetone (80:20) and ether-acetone (50:50) 0.168 part of crystals with melting point 149–152° C. is obtained which is the (2—4β)-lactone of $\Delta^{8a}$-1-ethoxy-ethinyl-2α-(2':3'-dihydroxy - propyl) - 2β - carboxy - 4bβ - methyl - 7 - ethylenedioxy - 1:2:3:4:4aα:4b:5:6:7:8:10:10aβ - dodecahydrophenanthrene-1:4β-diol.

0.072 part by weight of the above glycol with melting point 149–152° C. is hydrogenated in 6 parts by volume of a mixture of 1 part by volume of pyridine and 9 parts by volume of alcohol with 0.035 part by weight of a palladium on calcium carbonate catalyst (of 2% strength) at 25° and 760 mm. pressure of mercury. The hydrogen uptake ceases within 12 minutes after 3.5 parts by volume (=92% of the calculated quantity) have been taken up. The hydrogenation-solution is suction-filtered through a layer of kieselguhr (Hyflo Super-Cel) on a filter and the clear solution evaporated under reduced pressure. The residue is crystallized from a mixture of acetone, ether and pentane and 0.067 part by weight of the (2—4β)-lactone of $\Delta^{8a}$-1-ethoxyethenyl-2α-(2':3':dihydroxypropyl) - 2β - carboxy - 4bβ - methyl - 7 - ethylenedioxy - 1: 2:3:4:4aα:4b:5:6:7:8:10:10aβ - dodecahydrophenanthrene-1:4β-diol with melting point 174–176° C. is obtained.

0.062 part by weight of the above ethoxyethenyl derivature is dried for 45 minutes at 60° C. under 0.01 mm. pressure of mercury, mixed with 0.026 part by volume of pyridine and 2.5 parts by volume of a solution of 0.063 part by volume of acetic anhydride in 10 parts by volume of absolute benzene and allowed to stand for 18 hours at 20° C. The acetylation product is washed neutral with 2 N-hydrochloric acid, 2 N-sodium carbonate solution and water and chromatographed over 2 parts by weight of aluminum oxide. From the fractions eluated with chloroform-methanol (95:5) 0.016 part by weight of crystals melting at 148–150.5° C. is obtained which is the (2→4β)-lactone of $\Delta^{8a}$-1-ethoxyethenyl - 2α - (2'-hydroxy - 3' - acetoxy-propyl) - 2β - carboxy-4bβ-methyl-7-ethylendioxy - 1:2:3:4:4aα:4b:5:6:7:8:10:10aβ - dodecahydrophenanthrene-1:4β-diol.

0.027 part by weight of the above acetate is dissolved in 1 part by volume of pyridine and added to 0.06 part by weight of CrO₃ in 0.6 part by volume of pyridine. After 16 hours the mixture is worked up. The neutral crude product is chromatographed over 1.5 parts by weight of silica gel. From the fractions eluated with ether and with ether-chloroform (90:10) 0.008 part by weight of hexagonal plates melting at 150–152° C. is obtained which is the (2→4β)-lactone of $\Delta^{8a}$-1-ethoxyethenyl-2α-(2'-oxo-3'-acetoxy-propyl) - 2β - carboxy - 4bβ-methyl-7-ethylenedioxy - 1:2:3:4:4aα:4b:5:6:7:8:10:10aβ - dodecahydro-phenanthrene-1:4b-diol. From the fractions eluted with ether-chloroform mixtures (90:10, 75:25 and 25:75) 0.006 part by weight of starting material are isolated.

0.15 part by weight of the above ketone melting at 150–152° C. is mixed with 5.0 parts by volume of a solution of 0.14 part by volume of phosphorus tribromide, 0.476 part by volume of pyridine and 19.4 parts by volume of methylene chloride and stirred for 4 hours at 25° C. under nitrogen. Ice and a suspension of 2 parts by weight of sodium hydrogen carbonate in 10 parts by volume of water are then added. The solution is washed neutral with 0.6 N-phosphoric acid, potassium hydrogen carbonate solution of 10 percent strength and water, is dried and evaporated under reduced pressure. There results 0.12 part by weight of a colorless foam which yields from acetone-ether 0.043 part by weight of leaflets melting at 216–222° C., λ max:245 mμ log ε=4.09; 333 mμ log ε=1.76 in dioxane. The resulting product is the (2—4β)-lactone of $\Delta^{8a}$-1:1-formylmethylene-2α-(2'-oxo-3'-acetoxy-propyl) - 2β - carboxy - 4bβ -methyl - 7 - ethylenedioxy - 1:2:3:4:4aα:4b:5:6:7:8:10:10aβ - dodecahydrophenanthrene-4β-ol.

0.2 part of the above αβ-unsaturated aldehyde is dissolved in 8.5 parts by volume of α-pyrrolidone and washed with 8.5 parts by volume of tetrahydrofurane on to 0.1 part by weight of palladium on carbon (10%) and hydrogenated at 25° C. under 760 mm. pressure of mercury. The hydrogenation ceases after 65 minutes when 9.5 parts by volume of hydrogen have been taken up. The hydrogenation solution is suction-filtered through a layer of kieselguhr (Hyflo Super-Cel) on a filter and the clear filtrate is diluted with about 100 parts by volume of chloroform-ether (1:3) and the solution extracted 6 times with 8 parts by volume of water each time. The chloroform-ether solutions dried over sodium sulfate and evaporated under reduced pressure give 0.222 part by weight of residue which is dissolved in 11 parts by volume of xylene and boiled under reflux with 0.22 part by volume of triethylamine and 0.11 part by volume of glacial acetic acid in an atmosphere of nitrogen for 7 hours. After cooling, the mixture is diluted with chloroform-ether and washed with 8 parts by volume each of ice-water (twice), 0.5 N-sodium carbonate solution with the addition of ice (4 times), 0.6 -m.phosphoric acid with the addition of ice (five times) and water (three times). The chloroform-ether solutions are dried over sodium sulfate and evaporated under reduced pressure. The residue is dissolved in 25 parts by volume of benzene, mixed with 0.3 part by volume of pyridine and 0.3 part by volume of acetic anhydride and allowed to stand for 14 hours at 20° C. The mixture is then diluted with chloroform-ether and washed neutral as described above. The residue is chromatographed over 4.5 parts by weight of silica gel. The fractions (0.064 part by weight) eluated with benzene-ether (80:20), benzene-ether (65:35) and benzene-ether (50:50) are distributed on Whatman No. 1 paper. Partition chromatography is carried out in the system benzene-cyclohexane (1:1) as mobile phase and formamide as stationary phase (development with blue tetrazolium). The zones with $R_F$ 0.25–0.30 are cut out and eluated with methanol-water (50:50), methanol-water (130:30), and methanol and chloroform. The eluates concentrated under reduced pressure are extracted six times with 100 parts by volume of chloroform each time and the chloroform solutions washed with 10 parts by volume each of 10% potassium hydrogen carbonate solution and water, dried over sodium sulfate and evaporated under reduced pressure. The residue (0.0085 part by weight) is chromatographed over 0.45 part by weight of silica gel. From the fractions eluated with benzene-ether (80:20) and benzene-ether (50:50) 0.003 part by weight of crystals melting at 153–159° C. is obtained. The latter are recrystallized from a mixture of acetone, ether and pentane. They form stick shapes melting at 159–161° C.; λ max: 240 mμ log ε=3.74 in alcohol. The product is the (18—11β)-lactone of d:1-$\Delta^{5\cdot16}$-3-ethylenedioxy - 11β - hydroxy - 21 - acetoxy - 20 - oxo-pregnadiene-18-acid.

This compound on hydrogenation in alcoholic solution with a palladium on calcium carbonate catalyst and isolation of the product in the usual way gives the (18—11β)-lactone of the d:1 $\Delta^5$-3-ethylenedioxy-11β-hydroxy-21-acetoxy-20-oxo pregnene which can be recrystallized from acetone and melts at 231–233° C.

*Example 4*

0.456 part by weight of (2→4β)-lactone of $\Delta^{8a}$-1-ethoxyethinyl-2α-allyl - 2β - carboxy - 4bβ - methyl - 7 - ethylenedioxy - 1:2:3:4:4aα:4b:5:6:7:8:10:10aβ - dodecahydrophenanthrene-1:4β-diol with melting point 182° C. (isomeric to the starting material of Example 3) is dissolved in 1.40 parts by volume of pyridine, diluted with 45 parts by volume of ether and mixed with the solution of 0.3 part by weight of osmium tetroxide in 12 parts by volume of absolute ether. After 150 minutes at 25° C. the mixture is diluted with 45 parts by volume of ether and then run slowly in the course of 15 minutes into 135 parts by volume of methanol and 135 parts by volume of aqueous 0.25-m. ammonium sulfite solution. After 60 minutes at 25° C. the ether and the methanol are distilled off at 30° C. bath temperature under reduced pressure and the aqueous solution is extracted 4 times with chloroform. The chloroform extracts are washed, dried over sodium sulfate and evaporated under reduced pressure, and the residue crystallized from acetone. There is obtained 0.301 part by weight of short stick shapes melting at 222.5–224° C., which are the (2→4β)-lactone of $\Delta^{8a}$-1-ethoxyethinyl - 2α - (2',3'-dihydroxypropyl) - 2β-carboxy-4bβ-methyl - 7 - ethylenedioxy - 1:2:3:4:4aα:4b:5:6:7:8:10:10aβ-dodecahydrophenanthrene-1.4β-diol isomeric in the 1-position. 0.093 part by weight of the same product are obtained by chromatographing the mother liquors.

0.227 part by weight of the above glycol with melting point 222.5–224° C. is dissolved in 2 parts by volume of pyridine, diluted with 18 parts by volume of alcohol and added to 0.12 part by weight of a palladium on calcium carbonate catalyst. Hydrogenation at 25° C. under 760 mm. pressure of mercury ceases after 10.2 parts by volume of hydrogen have been taken up within 6 minutes. The hydrogenation solution is suction-filtered through kieselguhr (Hyflo Super-Cel) and the filtrate evaporated under reduced pressure. The residue yields from a mixture of acetone and ether 0.213 part by weight of needles with melting point 221–226° C. which after recrystallization from acetone-ether melt at 224–227° C. and are the (2→4β)-lactone of $\Delta^{8a}$-1-ethoxy-ethenyl-2α-(2',3'-dihydroxy - propyl) - 2β - carboxy - 4bβ-methyl-7-ethylenedioxy - 1:2:3:4:4aα:4b:5:6:7:8:10:10aβ - dodecahydro - phenanthrene - 1:4β - diol. isomeric in the 1-position.

*Example 5*

0.89 part by weight of (2→4β)-lactone of $\Delta^{8a}$-1-ethoxyethenyl - 2α - allyl - 2β - carboxy - 4bβ - methyl-7-ethylenedioxy - 1:2:3:4:4aα:4b:5:6:7:8:10:10aβ - dodecahydrophenanthrene - 1:4β - diol melting at 195–200° C. (obtained by selective hydrogenation of the corresponding ethoxyethinyl compound) is dissolved in 50 parts by volume of absolute benzene and 1 part by volume of pyridine and mixed with 0.590 part by weight of osmium tetroxide in 20 parts by volume of absolute ether at 20° C. After 2½ hours at 20° C. the mixture is diluted with 70 parts by volume of ether and then 150 parts by volume of methanol and 8 parts by weight of ammonium sulfite in 150 parts by volume of water are added slowly in the course of 10 minutes. After one hour the mixture is suction-filtered through a layer of kieselguhr (Hyflo Super-Cel) on a filter and the clear filtrate is concentrated under reduced pressure at a bath temperature of 30° C. to about 150 parts by volume. The aqueous solution is extracted with chloroform-ether; the chloroform-ether solutions are washed twice with a little water, dried over sodium sulfate and evaporated under reduced pressure. (Residue: 0.892 part by weight). From acetone-ether 0.22 part by weight of crystals melting at 232–236° C. is obtained. This compound is the (2→4β)-lactone of $\Delta^{8a}$-1-ethoxyethenyl - 2α - (2',3' - dihydroxy-propyl)-2β-carboxy-4bβ-methyl - 7 - ethylene - dioxy-1:2:3:4:4aα:4b:5:6:7:8:10:10aβ-dodecahydrophenanthrene-1:4β-diol isomeric in the 1-position. The mother liquor (0.682 part by weight) of the above product is chromatographed over 20 parts by weight of silica gel. From the fractions obtained with benzene-ether (50:50) 0.27 part by weight of starting material is recovered altogether. From the fraction eluated with ether alone and ether and 10 to 20% acetone 0.025 part by weight of crystals melting at 232–366° C. is obtained. The further fractions eluated with ether-acetone (70:30) yield from acetone-ether 0.176 part by weight of crystals melting at 140°/185–190° C. which are isomeric to the above glycol melting at 232–236° C.

0.45 part by weight of the glycol melting at 232–236° C. is dried for half an hour under reduced pressure at 50° C., dissolved in 5 parts by volume of absolute benzene and 3 parts by volume of absolute chloroform, mixed with 0.3 part by volume of pyridine and 0.16 part by volume of acetic anhydride and allowed to stand for 2 days at 20° C. On working up 0.513 part by weight of a crude product is obtained which after crystallization form acetone-ether yields 0.29 part by weight of (2→4β)-lactone of $\Delta^{8a}$ - 1 - ethoxyethenyl-2α-(2'-hydroxy-3'-acetoxy-propyl) - 2β - carboxy - 4bβ - methyl - 7 - ethylene-dioxy-1:2:3:4:4aα:4b:5:6:7:8:10:10aβ - dodecahydrophenanthrene-1:4β-diol isomeric in the 1-position melting at 191–193° C.

0.224 part by weight of the isomeric glycol melting at 140/185–190° C. are dried in an analogous manner, dissolved in 4 parts by volume of absolute benzene and 1 part by volume of absolute chloroform, mixed with 0.2 part by volume of pyridine and 0.08 part by volume of acetic anhydride and allowed to stand for one day at 20° C. On working up 0.224 parts by weight of a crude product there are obtained which yields from acetone-ether 0.07 part by weight of the isomeric acetate melting at 195–199° C. In admixture with the above acetate melting at 191–193° C. a pronounced depression of the melting point is observed.

0.12 part by weight of the above acetate melting at 191–193° C. is dissolved in 4 parts by volume of pyridine and added to 0.53 part by weight of chromic acid in 8 parts by volume of pyridine. After 24 hours the mixture is worked up. The neutral crude product (0.103 part by weight) yields after crystallization from acetone-ether 0.046 part by weight of (2→4β)-lactone of $\Delta^{8a}$-1-ethoxy ethenyl - 2α - (2' - oxo - 3'-acetoxy-propyl)-2β-carboxy-4bβ - methyl - 7 - ethylenedioxy - 1:2:3:4:4aα:4b:5:6:7:8:10:10aβ - dodecahydrophenanthrene - 1:4β - diol isomeric in the 1-position melting at 192–196° C.

0.165 part by weight of the isomeric acetate melting at 195–199° C. is dissolved in 5 parts by volume of pyridine and added to 0.32 part by weight of chromic acid in 5 parts by volume of pyridine. After 24 hours the mixture is worked up. From the neutral crude product there is obtained after crystallization from acetone ether 0.071 part by weight of the ketol acetate described above melting at 192–196° C.

0.12 part by weight of the ketol acetate melting at 192–196° C. is mixed with 5 parts by volume of a solution of 0.14 part by volume of phosphorus tribromide, 0.476 part by volume of pyridine and 19.4 parts by volume of methylene chloride and allowed to stand for 4 hours at 0° C. under nitrogen. The mixture is then poured at 0° C. into a solution of sodium hydrogen carbonate (10 parts by weight in 10 parts by volume of water) and extracted with chloroform-ether. The solution is washed neutral with a 0.6 molar solution of phosphoric acid, 10% potassium carbonate solution and water and yields after evaporation 0.102 part by weight of a crude product. There is obtained from chloroform-ether 0.055 part by weight of the (2→4β)-lactone of $\Delta^{8a}$-1:1-formyl-methylene - 2α - (2' - oxo - 3'-acetoxy-propyl)-2β-carboxy-4bβ-methyl - 7 - ethylenedioxy - 1:2:3:4:4aα:4b:5:6:7:8:10:10aβ-dodecahydrophenanthrene-4β-ol described in Example 3.

*Example 6*

To a solution of ethyl magnesium bromide prepared from 2.20 parts of magnesium and 6.87 parts by volume of ethyl bromide in 50 parts by volume of anhydrous ether there are added 7.88 parts of freshly distilled ethoxy acetylene in 46.5 parts by volume of anhydrous ether in the course of 25 minutes. When the ethane has ceased to evolve, the whole is first stirred for 40 minutes at room temperature and then a solution of 1.226 parts of 2α-methallyl-2β-carbethoxy-4β-ethoxycarboxy-4bβ-methyl-7-ethylene - dioxy - 1:2:3:4:4aα:4b:5:6:7:8:10:10aβ-dodecahydrophenanthrene-1-one melting at 99.5–101° C. in 32.5 parts by volume of benzene is added dropwise. The mixture is stirred for 18 hours at room temperature, ice is then added and saturated ammonium chloride solution, and the organic layer is separated off. The ether-benzene extract is washed with water, dried with sodium sulfate, filtered and evaporated in vacuo. The residue is dissolved in a mixture of hexane and benzene (3:1) and chromatographed on a column of 132 parts of aluminum oxide prepared under hexane. With a mixture of hexane and benzene (3:1) and (1:1) and with benzene only traces of substance are removed. The extracts obtained with a mixture of benzene and ether (19:1), ether and a mixture of ether and ethyl acetate (9:1) are examined by paper chromatography in the phenyl Cellosolve/heptane system using an antimon trichloride solution as indicator. In the portions extracted with a mixture of benzene and ether (19:1) there is substantially unchanged starting material. The fractions extracted with ether and with the first fraction of the mixture of ether and ethyl acetate (9:1) consist chiefly of a substance more strongly polar than the starting material and exhibiting an intense vermilion with antimon trichloride under the quartz lamp. These extracts are combined and separated from strongly polar impurities of cellulose by distribution in the system 80% methanol/heptane. In this way there is obtained the pure 1 - (ethoxy-ethinyl)-2α-methallyl-2β-carbethoxy-4β-ethoxy-carboxy-4bβ-methyl-7-ethylene - dioxy-1:2:3:4:4aα:4b:5:6:7:8:10:10aβ-dodecahydrophenanthrene-1-ol as a colorless lacquer.

*Example 7*

The starting material used in Examples 1 and 2 is prepared in the following manner:

To a solution of ethyl magnesium bromide prepared from 2.432 parts of magnesium and 9.820 parts of ethyl bromide in 110 parts by volume of anhydrous ether there are added at 12–15° C. internal temperature in the course of 30 minutes 7.88 parts of freshly distilled ethoxy acetylene in 51.5 parts by volume of anhydrous ether. When ethane ceases to evolve, the mixture is stirred for 15 minutes with icewater cooling, the two-phase system homogenized by the addition of 110 parts by volume of benzene and a solution of 7.115 parts of the (2—4β)-lactone of 2α-methallyl-2β-carboxy-4bβ-methyl - 7 - ethylene-dioxy-1:2:3:4:4aα:4b:5:6:7:8:10:10aβ - dodecahydrophenanthrene-4β-ol-1-one described in our copending application Serial No. 585,167, filed May 16, 1956, now Patent No. 2,934,543, issued April 26, 1960, in 80 parts by volume of benzene is added dropwise in the course of 15 minutes at 0–3° C. The mixture is stirred for 3 hours at 0–3° C., ice and saturated ammonium chloride solution are then added; the ether and benzene layer is washed with ammonium chloride solution and with water, dried with sodium sulfate, filtered and evaporated under reduced pressure. The residue is dissolved in ether and filtered through a layer of activated carbon to remove the color. On concentrating there is obtained the (2→4β)-lactone of 1-ethoxy - ethinyl-2α-methallyl-2β-carboxy-4bβ-methyl-7-ethylene - dioxy - 1:2:3:4:4aα:4b:5:6:7:8:10:10aβ-dodecahydrophenanthrene-1:4β-diol melting at 138–140° C. A second crystalline modification of the same substance has a melting point of 142–143° C.

*Example 8*

The starting material for the above Examples 3, 4 and 5 is prepared as follows:

0.306 part of ethyl bromide in 10 parts by volume of absolute ether (distilled over phosphorus pentoxide) is slowly added with exclusion of moisture to 0.068 part of activated magnesium turnings. When the reaction is complete 1 part of ethoxy acetylene in 20 parts by volume of benzene is added dropwise with agitation in the course of 10 minutes and then agitated for another hour. A solution of 0.5 part of the (2→4β)-lactone of the 2α-allyl-2β-carboxy-4bβ-methyl-7-ethylenedioxy - 1:2:3:4:4aα:4b:5:6:7:8:10:10aβ - dodecahydrophenanthrene - 1 - one-4β-ol (whose preparation is described in our copending application Serial No. 585,167, filed May 16, 1956, now Patent No. 2,934,543, issued April 26, 1960, in 20 parts by volume of benzene is then added to the reaction mass and the whole is allowed to stand for 4 hours at about 20° C. It is then poured onto ice and extracted with ether. The emulsions are broken down with a saturated solution of ammonium chloride. The ethereal solution is washed with water, dried over sodium sulfate and evaporated. The resulting crude product (0.65 part) is chromatographed on 16 parts of aluminum oxide. The fraction eluated with benzene yield 0.14 part of starting material. From the portions extracted with mixtures of benzene and ether with up to 50% ether content there is obtained by crystallization from a mixture of ether and petroleum ether 0.265 part of (2→4β)-lactone of 1-ethoxy-ethinyl-2α-allyl-2β-carboxy - 4bβ - methyl-7-ethylene-dioxy-1:2:3:4:4aα: 4b:5:6:7:8:10:10aβ - dodecahydrophenanthrene - 1:4β-diol in thick platelets melting at 149–152° C.

The further fractions (0.057 part) eluated with mixtures of benzene and ether and pure ether yield from ether the compound epimeric at carbon atom 1 in colorless prisms melting at 180–182° C.

What is claimed is:

1. The compound of the formula

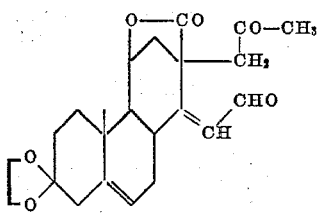

2. The compound of the formula

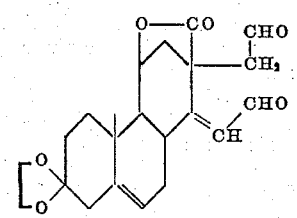

3. The compound of the formula

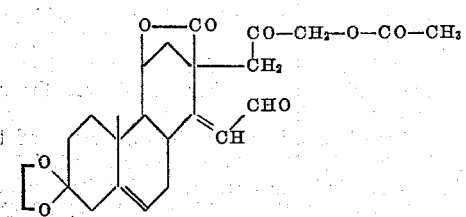

4. The compound of the formula

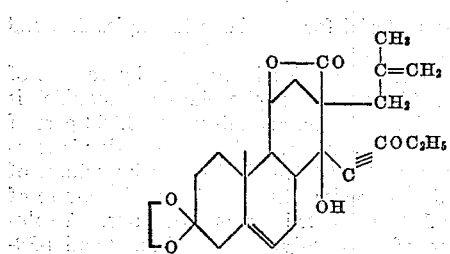

5. The compound of the formula

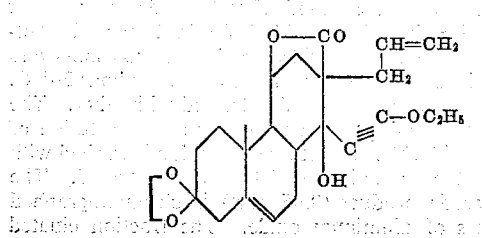

6. The compound of the formula

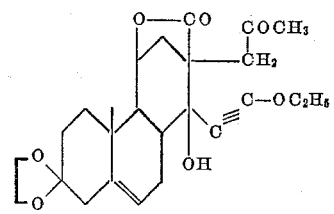

7. The compound of the formula

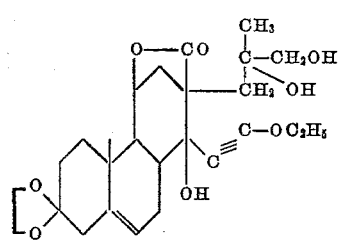

8. The compound of the formula

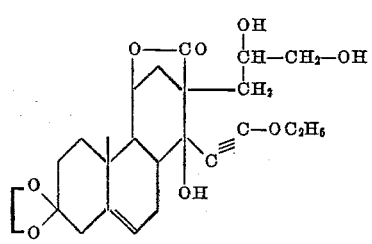

9. The compound of the formula

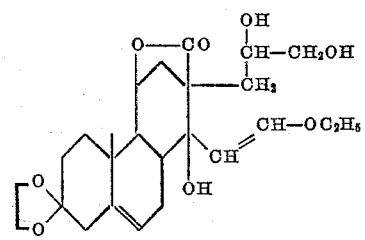

10. The compound of the formula

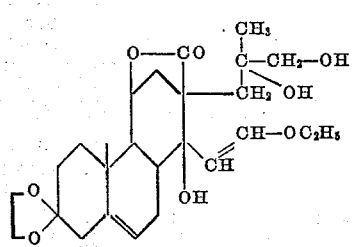

11. The compound of the formula

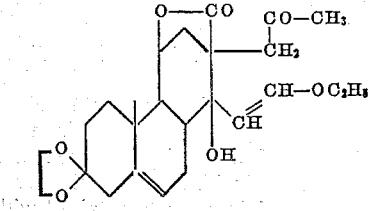

12. The compound of the formula

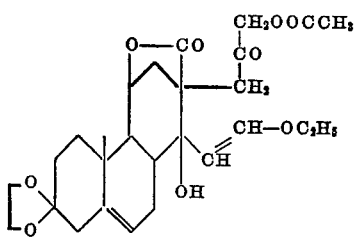

13. A compound of the formula:

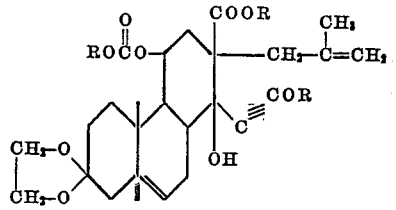

in which R is lower alkyl.

14. A member of the group consisting of a compound of the formula:

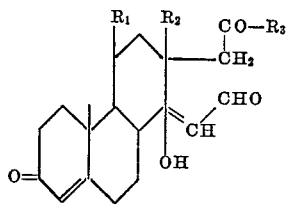

in which $R_1$ stands for a member of the group consisting of hydroxyl, lower alkoxy carbonyloxy, oxy linked to the carbon atom of group $R_2$, and oxo, $R_2$ represents a member of the group consisting of hydroxymethyl, lower alkanoyloxymethyl, formyl, formyl acetalized with the 4-hydroxyl, carboxyl, carboxyl esterified with lower alkanol, and carboxyl lactonized with the 4-hydroxyl, and $R_3$ represents a member of the group consisting of hydrogen, methyl, hydroxymethyl and lower alkanoyloxymethyl, and 7-ketals of these compounds with lower alkane-diol.

15. A member of the group consisting of compounds of the formulae:

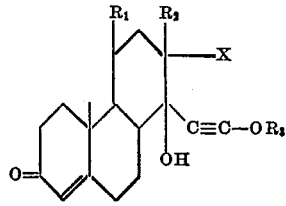

and

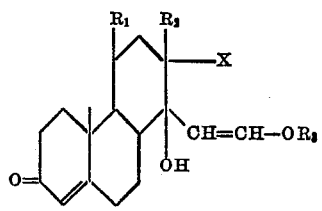

and 7-ketals of such compounds with lower alkane-diol, in which $R_1$ stands for a member of the group consisting of hydroxyl, lower alkoxy carbonyloxy, oxy linked to the carbon atom of group $R_2$, and oxo, $R_2$ represents a member of the group consisting of hydroxymethyl, lower alkanoyloxymethyl, formyl, formyl acetalized with the 4-hydroxyl, carboxyl, carboxyl esterified with lower alkanol, and carboxyl lactonized with the 4-hydroxyl, $R_3$ represents lower alkyl, and X stands for a member of the group consisting of alkyl, methallyl, 2',3'-dihydroxypropyl, 2'-methyl-2',3'-dihydroxy-propyl, acetonyl, hydroxyacetonyl, and alkanoyloxy acetonyl.

References Cited in the file of this patent

UNITED STATES PATENTS

| | | |
|---|---|---|
| 2,689,856 | Miescher et al. | Sept. 21, 1954 |
| 2,720,529 | Feurer | Oct. 11, 1955 |

OTHER REFERENCES

Schmidlin, Experientia, vol. XI, Fasc. IX, pages 365–368, Sept. 15, 1955.